United States Patent Office 3,689,433
Patented Sept. 5, 1972

3,689,433
PROCESS FOR PREPARING OLEFIN DISPRO-
PORTIONATION CATALYSTS
Wolfram R. Kroll and Gerald Doyle, Somerville, N.J.,
assignors to Esso Research and Engineering Company,
Linden, N.J.
No Drawing. Filed Mar. 4, 1970, Ser. No. 16,562
Int. Cl. C07c 3/62
U.S. Cl. 252—429 R                                    8 Claims

ABSTRACT OF THE DISCLOSURE

A process for preparing a catalyst which consists essentially of contacting a carbene complex selected from the group consisting of complexes having the formulas $$A[M(CO)_5COR] \text{ and } M(CO)_5(COR)R'$$

wherein A is a unipositive cation selected from the group consisting of Li, Na, K and cations having the general formula $J_4Q$ wherein Q is a Group V element and J is selected from the group consisting of hydrogen and $C_1$ to $C_{30}$ hydrocarbyl radicals, M is a Group VI–B metal, R and R' are $C_1$ to $C_{30}$ hydrocarbyl radicals, with $AlY_3$ or an organometallic halide selected from the group consisting of compounds having the general formula $R''_n DY_m$ where R'' is chosen from the group consisting of $C_1$ to $C_{30}$ hydrocarbyl radicals, D is a metal selected from the group consisting of Group II and Group III of the Periodic Table of the Elements, Y is a halide, and $n$ is an integer of from 1 to 3 and $m$ is an integer of from 0 to 3, their total equal to the valence of D, the molar ratio of organo-metallic halide to Group VI–B metal being from about 0.5:1 and 50:1, at a temperature of from about $-100$ to $+150°$ C. and a pressure of from about 0.1 to 1000 atmospheres, whereby a catalyst is formed. The resulting catalyst is useful for disproportionating olefins.

BACKGROUND OF THE INVENTION

This invention relates to a novel process for producing a unique catalyst, said catalyst being especially effective for the disproportionation of olefins.

The disproportionation of olefins refers to those reactions in which one or more olefinic compounds are transformed into other olefins of different molecular weights. The reaction can be regarded as consisting of the breaking of the double bonds of the reacting olefins and the recombination of the resulting fragments in such a manner that new olefinic products will result.

In the past a variety of catalysts had been known for this purpose. Typical of such catalysts is a catalyst comprising a Group VI–B metal complex represented by the formula $[(L)_a M_b Z_c]_x$ wherein each (L) is a CO, $R_3Q$, $R_3QO$, $P_2Q$—$QR_2$ or $R^2(COO)_m$ ligand, each Z is a halogen or CN, SCN, OCN, or $SnCl_3$ radical; M is Mo, W, MoO, $MoO_2$, WO, $WO_2$ preferably Mo or W; Q is phosphorous, arsenic, or antimony; $a$ is 1–6, $b$ is 1–2, generally 1, $c$ is 0–5 and the number of (L) and Z groups present in the complex is not greater than the number required for the metal to achieve the closed shell electronic configuration of the next higher atomic number inert gas; $x$ is a number, generally 1, representing the polymeric state of the complex; R is an aromatic or saturated aliphatic hydrocarbon radical, including alkoxy and halo derivatives thereof, having up to 20 carbon atoms; $m$ is 1 or 2; $R^2$ is an aromatic, saturated aliphatic, or ethylenically unsaturated hydrocarbon radical having up to 30 carbon atoms, $R^2$ being monovalent when $m$ is 1 and divalent when $m$ is 2; with an organometallic reducing agent.

Variations on the above catalyst are also known in which Group VII metals are utilized as well as Group VIII metals. Although these catalysts have proven to be somewhat successful in the disproportionation of olefins their acceptance has been hindered somewhat by the great expense associated with their production. In addition, many of these catalysts have not shown great activity particularly at lower temperatures, i.e. temperatures in the range of $-25$ to $40°$ C.

Heterogeneous catalysts which have been utilized for olefin disproportionation in the past have had only limited success as indicated by their relatively low activities and selectivities and the requirement that the reactions must be carried out in the vapor state.

SUMMARY OF THE INVENTION

According to this invention it has unexpectedly been found that ionic carbene complexes having the general fromula $A[M(CO)_5COR]$ when reacted with an organometallic derivative of a Group II to III metal, preferably a II–A, or III–A organo metal halide produce an extremely effective catalyst, especially for olefin disproportionation.

In the above formula A is a suitable cation chosen from any of several unipositive cations, e.g. a tetraalkyl or aryl substituted Group V element. M is a Group VI–B metal and R is a hydrocarbyl radical such as methyl or phenyl.

In addition it has been found that non-ionic or neutral carbene complexes of the type $M(CO)_5(COR)R'$ where M is a Group VI–B metal, R and R' are hydrocarbyl radicals, preferably $C_1$–$C_{30}$ radicals, alkyl, aryl and R may be identical to R' or different, can be converted into active catalysts by reaction with an organometallic halide wherein the metallic element is selected from Group II–III of the Periodic Table, preferably aluminum, and a quaternary ammonium halide activator.

More generally we have found that other ionic and neutral carbene complexes of Group VI transition metals can be used in accordance with the catalyst activation schemes disclosed above. These other carbene complexes comprise following general types:

(I) $A[M(CO)_n LL'(CG)]$ (II) $M(CO)_n LL'(CG)R'$ in which A denotes the same types of cations as disclosed above, M is a Group VI transition metal, L is a neutral ligand as e.g. CO, NO, $PF_3$, phosphines, phosphites, diphosphines, L' is an unsaturated ligand as e.g. cyclopentadienyl, phenyl, allyl, $n$ is usually between 3 and 5, R' is a hydrocarbyl radical, e.g. alkyl, aryl, cycloalkyl, cyclopentadienyl, and G is a radical which determines the type of carbene ligand. Among the radicals used for G are: OR, SR, $NR_2$, $PR_2$, $OSiR_3$, $OSnR_3$, $OPbR_3$, $OSbR_2$, $OAsR_2$, $OBiR_2$, OHgR, OZnR, OMgR and others.

The reaction between the Group VI–B ionic or nonionic metal carbene complex and the organometallic derivative may take place at temperatures which range from below ambient to elevated and pressures which would vary from subatmospheric to superatmospheric. The reaction should take place in a solvent, preferably an inert solvent or in the reacting olefin itself as a solvent; modifiers may be added to the catalyst mixture to alter the type of reaction, reaction rate or selectivity of the reaction. Typical modifiers would include the various Lewis bases.

In more detail the instant invention pertains to a novel catalyst, means for preparing said catalyst and the use of such catalysts in the disproportionation reaction.

To produce the catalyst of the instant invention, one must make use of the reaction product of an ionic Group VI–B metal carbene complex of the type $$A[M(CO)_5COR]$$

with one or several organometallic derivatives having the general formula $R''_n DY_m$. In the above formulae A is a unipositive cation.

Generic examples of such cations include the following:
(1) alkali metal ions such as Li, Na or K.
(2) cations of the general type $J_4Q$ where Q is a Group V element such as nitrogen, phosphorous, arsenic and the like and J can be either hydrogen or an aromatic, saturated aliphatic or unsaturated hydrocarbon radical having up to 30 carbon atoms. The four J radicals need not be identical but are preferably phenyl or a $C_1$ to $C_6$ alkyl group. Typical examples of such cations are as follows:

tetrabutylammonium
tetraphenylphosphonium
tetraphenylarsonium
methyltriphenylphosphonium
triphenylmethylammonium
pyridinium
Cs+ benzyltrimethylphosphonium
K+ tetra(n-propyl)ammonium
Na+ tetraphenylstibonium
tetradecylammonium M is a Group VI–B metal and would thus have to be selected from Cr, Mo, or W.

R comprises hydrocarbyl radicals, preferably $C_1$–$C_{30}$ hydrocarbyl radicals, including alkyl, aryl, alkenyl, cycloalkyl, cyclopentadienyl groups, preferred hydrocarbyl radicals are methyl, butyl and phenyl.

The organometallic derivatives would include organometallic halides, pseudohalides and the like. Consequently, D, the metallic element, may be selected from Group II or Group III metals more preferably the Group II–A, or III–A metals of atomic number 12 to 81; the most preferred element for D is aluminum. Further, R'' may be any aromatic or aliphatic radical including halide, alkoxy and similar derivatives or hydrogen, Y is a halide, n is are integers of from 1 to 3 and m are integers from 0 to 3 and their total is equal to the valence of D. More specifically, R'' may be substituted or unsubstituted, saturated or unsaturated, but should preferably be hydrocarbyl in nature and more preferably still would be a $C_1$ to $C_{30}$ hydrocarbyl. Thus, the general category of alkyl, aryl, alkaryl, aralkyl, cycloalkyl and cycloalkenyl would be included. Alkyl groupings of $C_1$ to $C_{30}$ are especially satisfactory, as are aryl groupings of $C_6$ to $C_{20}$, alkaryl groupings of $C_7$ to $C_{20}$ and aralkyl groupings of $C_7$ to $C_{20}$. The cyclic groupings, both cycloalkyl and cycloalkenyl are preferred when they have 3 to 15 carbons. The above groupings would include for example, methyl, ethyl, n-propyl, isopropyl, isobutyl, secondary-butyl, tert-butyl, n-amyl, isoamyl, heptyl, n-octyl, n-dodecyl, and the like; 2-butenyl, and the like, cyclo-pentyl-methyl, cyclohexylethyl, cyclohexylpropyl, and the like; 2-phenyl ethyl, 2-phenyl propyl, 2-naphthyl ethyl, methyl naphthyl ethyl, and the like; cyclopentyl, cyclohexyl, 2,2,1-bicycloheptyl, and the like; methyl cyclopentyl, dimethyl cyclopentyl, ethyl cyclopentyl, methyl cyclohexyl, dimethyl cyclohexyl, 5-cyclopentadienyl, and the like; phenyl cyclopentyl, and the like; phenyl, tolyl, xylyl, ethyl phenyl, naphthyl, cyclohexyl phenyl, and the like. In general, the R'' group can contain up to about 20 carbon atoms and D may be selected from such metals as magnesium calcium, strontium, zinc, cadmium, mercury, boron, aluminum, gallium, indium and thallium.

Preferred activating agents are aluminum derivatives of the formula $RAlY_2$ wherein R is selected from the group consisting of hydrogen and $C_1$–$C_{20}$ hydrocarbyl radicals, including oxyhydrocarbyls, e.g. alkoxides, preferably alkyl radicals, wherein at least one R is a hydrocarbyl radical; and Y is a halide. More preferably alkylaluminum halides are employed as the activating agent. Alkyl radicals of 1–12 carbon atoms are most preferred. The preferred halides are Cl or Br with Cl being dichloride, ethylaluminum dichloride, methylaluminum sesquichloride, etc. may be employed. The most preferred compound is, however, methylaluminum dichloride. It is particularly important that these organometallic halides be substantially and preferably completely, free of water since water can cause hydrolysis of the activating agent, thereby inhibiting or destroying its activating potential.

In some instances Lewis acids such as $AlX_3$ wherein X is a halide may be used in place of the organometallic derivative.

In other instances the addition of a quaternary ammonium halide activator can be of advantage.

The neutral or non-ionic carbene complexes of the type $M(CO)_5(COR)R'$ in which M is a Group VI transition metal, preferably molybdenum or tungsten, R and R' are hydrocarbyl radicals as previously described, e.g. alkyl, aryl, cycloalkyl, cyclopentadienyl, are reacted with an organometallic halide of the type $R''_n DY_m$ as described above, and with activator a quaternary ammonium halide. The preferred quaternary ammonium halide is tetra-n-butyl ammonium chloride.

The formation of the actual catalyst is normally achieved by contacting the carbene complex with or without the activator, followed by addition of the organometal halide in presence of the unsaturated compound to be disproportionated. The contacting is done at a temperature of about $-100$ to $+150°$ C., preferably $-50$ to $+100°$ C., and most preferably $0°$ to $50°$ C. Pressure may vary between 0.1 and 1000 atm., preferably 0.5 and 200 atm. and most preferably 1 and 100 atm. The reactants are in the liquid phase. The ratio of organometallic derivative to Group VI–B metal compound may be varied between 0.5:1 and 50:1 on a mole basis, preferably 1:1 to 15:1 on a mole basis and most preferably 2:1 to 10:1. The molar ratio of activator to Group VI carbene complex is usually between 0.1 to 1 and 2 to 1. The preferential ratio is between 0.5 to 1 and 1:1.

Contacting time for the reaction may vary between 1 min. and several days preferably 0.05 and 48 hours and most preferably 0.1 to 24 hours.

The reaction proceeds most effectively within a solvent or the reacting olefin itself may act as a solvent; the solvent should be insert in nature and is preferably organic. Typical solvents which may be utilized are $C_1$ to $C_{15}$ alkanes, $C_6$ to $C_{20}$ aryls, $C_1$ to $C_{10}$ halo alkanes such as methyl chloride, $C_6$ to $C_{15}$ haloaryls, and certain haloalkenes which have a halogen substituted on the double bond. Examples of solvents which may be used include pentane, hexane, decane, benzene, xylene, carbon tetrachloride, dichloromethane, chlorobenzene, bromobenzene, tetrachloroethylene, trichloroethylene, etc.

The order of addition of the various compounds may be varied or reversed. In order to modify the cationic activity of such catalyst system which may be detrimental in the disproportionation of dienes which polymerize easily it is of advantage to add a small amount of a Lewis base, e.g. an ether, in less than the stoichiometric amount of organometallic halide employed.

The catalyst may also be deposited on an inert solid support such as silica or alumina.

The basic formula for the homo disproportionation of an olefin is as follows:

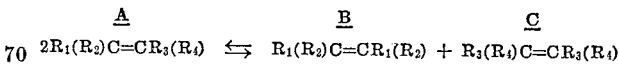

In the above reaction $R_1$, $R_2$ $R_3$ and $R_4$ may be selected from the group consisting of alkyl, aryl, alkenyl, alkaryl, aralkyl, cycloalkyl, cycloalkenyl or hydrogen. Additionally, halogenated derivatives of any of the preceding compounds may also be utilized provided that the halogen is more than two carbon atoms removed from the double bond; at least one of the group consisting of $R_1$, $R_2$, and $R_3$ and $R_4$ is an aryl radical or an $R'$—$CH_2$ radical wherein $R'$ is an alkyl, aryl, alkenyl, alkaryl, aralkyl, cycloalkyl or cycloalkenyl radical or a hydrogen atom. Halogenated derivatives of any of the aforesaid radicals may be utilized providing that the halogen is greater than 2 carbons removed from the double bond.

More particularly, $R_1$, $R_2$, $R_3$ and $R_4$ may be selected from the group consisting of $C_1$ to $C_{30}$ alkyl, $C_6$ to $C_{20}$ aryl including those aryls in which two aromatic rings are condensed, $C_2$ to $C_{30}$ alkenyl but not conjugated dienes, $C_7$ to $C_{20}$ alkaryls, $C_7$ to $C_{20}$ aralkyl, $C_3$ to $C_{20}$ cycloalkyl, $C_3$ to $C_{20}$ cycloalkenyl radicals provided that there are no conjugated double bonds within the cyclo alkenyl radical or a hydrogen atom. Again, halogenated derivatives, preferably chlorine, of the previously mentioned radicals may be utilized providing the chlorine or halogen utilized is more than two carbons removed from the double bond.

As previously mentioned, at least one of the said $R_1$, $R_2$, $R_3$ and $R_4$ must be an aryl radical or an $R'$—$CH_2$ radical wherein $R'$ is a $C_1$ to $C_{30}$ alkyl, a $C_6$ to $C_{20}$ aryl, a $C_2$ to $C_{20}$ alkenyl, $C_7$ to $C_{20}$ alkaryl, a $C_7$ to $C_{20}$ aralkyl, a $C_3$ to $C_{20}$ cycloalkyl or a $C_3$ to $C_{20}$ cycloalkenyl or a hydrogen atom. The most preferred values for $R_1$, $R_2$, $R_3$, and $R_4$ are $C_1$ to $C_{20}$ alkyls, $C_6$ to $C_{20}$ aryls and $C_2$ to $C_{20}$ alkenyls and hydrogen provided that at least one of said $R_1$, $R_2$, $R_3$, and $R_4$ is an aryl radical or an $R'CH_2$ radical or an $R'$ is a $C_1$ to $C_{20}$ alkyl, $C_6$ to $C_{20}$ aryl, and $C_2$ to $C_{20}$ alkenyl and hydrogen. Additionally, the catalyst of the instant invention is useful for cross disproportionation; by cross disproportionation it is meant those reactions in which a mixture of two different olefins is reacted to form at least one olefinic product. At least one of the products obtained is different of either of the reactants. The general concept of cross disproportionation is illustrated by the following formula:

$R_1(R_2)C=C(R_3)R_4 + R_5(R_6)C=C(R_7)R_8 \rightleftarrows$
$\quad R_1(R_2)C=C(R_7)R_8 + R_1(R_2)C=C(R_6)R_5 +$
$\quad\quad R_4(R_3)C=C(R_7)R_8 + R_4(R_3)C=(R_6)R_5$ Indicative of the homo disproportionation reaction and the products produced is the following table.

reverse of this reaction may also be carried out; thus, one may employ an acyclic polyolefin as a starting material and can obtain a cyclic mono or polyolefin and an acyclic mono or polyolefin of lesser molecular weight than the starting material as products.

The transformation of one or more cyclic mono- or polyolefins in such a manner that a new cyclic polyene of higher molecular weight is produced. A general equation for such a reaction would be

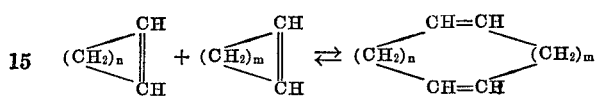

In this case $n$ and $m$ are integers which may vary from 2 to 30 and they may either be the same or different. It is understood that in this reaction the products may react further in a similar manner to form materials of higher molecular weight.

The transformation of one or more acyclic polyolefins so as to form cyclic-mono- or polyolefins and acyclic mono- or polyolefins. A general equation for such a reaction would be:

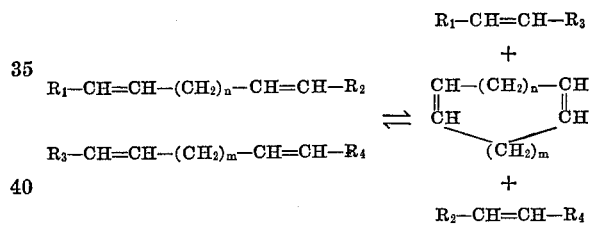

TABLE

| Reactant A | Products B | | C |
|---|---|---|---|
| 2 $R_1(R_2)C=CR_3(R_4)$ | $R_1(R_2)C=CR_1(R_2)$ | + | $R_3(R_4)C=CR_3(R_4)$ |
| $CH_3CH_2CH_2CH=CH_2$ | $CH_3CH_2CH_2CH=CHCH_2CH_2CH_3$ | + | $CH_2=CH_2$ |
| $CH_3(CH_2)_{17}CH=CH$ | $CH_3(CH_2)_{17}CH=CH(CH_2)_{17}CH_3$ | + | $CH_2=CH_2$ |
| $CH_3CH_2CH=CHCH_3$ | $CH_3CH_2CH=CHCH_2CH_3$ | + | $CH_3CH=CHCH_3$ |
| $C_6H_5CH_2CH_2CH=CH_2$ | $C_6H_5CH_2CH_2CH=CHCH_2CH_2C_6H_5$ | + | $CH_2=CH_2$ |
| $ClCH_2CH_2CH_2CH=CH_2$ | $ClCH_2CH_2CH_2CH_2CH=CHCH_2CH_2CH_2Cl$ | + | $CH_2=CH_2$ |
| ⬠—$CH_2CH=CH_2$ | ⬠—$CH_2CH=CHCH_2$—⬠ | + | $CH_2=CH_2$ |
| $CH_3CH_2\overset{CH_3}{\underset{|}{C}}=CHCH_2CH_2CH_3$ | $CH_3CH_2(CH_3)C=C(CH_3)CH_2CH_3$ | + | $CH_3CH_2CH_2CH=CH_2CH_2CH_3$ |
| $CH_2=CHCH_2CH=CH_2$ | $CH_2=CHCH_2CH—CHCH_2CH=CH_2$ | + | $CH_2=CH_2$ |
| ⬡—$CH=CH_2$ | ⬡—$CH=CH$—⬡ | + | $CH_2=CH_2$ |

Other disproportionation reactions of the instant invention include the following:

The transformation of a mixture of an acyclic mono- or polyolefin and a cyclic mono or polyolefin in such a way as to form a new acyclic polyolefin of higher molecular weight than the starting materials. A general equation for such a reaction would be

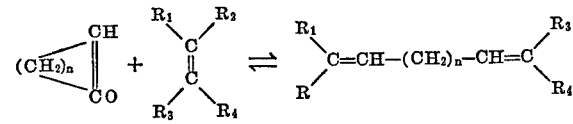

In this case $n$ is an integer varying from 2 to 30. The

In this case $n$ and $m$ are integers and may vary from 1 to 20 and may be either the same or different from each other.

In the above equations $R_1$ through $R_4$ are selected from the group consisting of alkyl, aryl, alkenyl, alkaryl, aralkyl, cycloalkyl, cycloalkenyl, halogen derivatives of the aforesaid and hydrogen. It is preferred that $R_1$ through $R_4$ be selected from the group consisting of $C_1$ through $C_{20}$ alkyl, $C_6$ to $C_{20}$ aryl, $C_2$ to $C_{20}$ alkenyl, $C_7$ to $C_{20}$ alkaryl, $C_7$ to $C_{20}$ aralkyl, $C_3$ to $C_{20}$ cycloalkyl and $C_3$ to $C_{20}$ cycloalkenyl, halogen derivatives thereof, preferably chlorine.

Typical reactants and products which illustrate the preceding reactions are as follows:

time with the same catalyst. Such dual function catalysts can be of advantage for the upgrading of naphthas.

TABLE

| Reactants | Products |
|---|---|
| CH₃CH₂CH₂CH=CHCH₂CH₂CH₃ + CH₃CH=CHCH₃ | CH₃CH₂CH₂CH=CHCH₃ |
| CH₃CH₂CH=CH₂ + CH₃CH₂CH₂CH=CHCH₃ | CH₃CH=CH₂ + CH₃CH₂CH₂CH=CH₂ + CH₃CH₂CH=CHCH₃ + CH₃CH₂CH₂CH=CHCH₂CH₃ |
| —CH=CH₂ + CH₃CH=CHCH₃ | —CH=CH—CH₃ + CH₂=CH₂=CHCH₃ |
| —CH₂CH=CH₂ + CH₃CH=CHCH₃ | —CH₂CH=CHCH₃ + CH₂=CHCH₃ |
| CH₃C=CH—CH₂—C(CH₃)—CH₃ + CH₃CH=CHCH₃ (with CH₃ substituents) | CH₃—C=CHCH₃ + CH₃CH=CH—CH₃—C—CH₃ (with CH₃ substituents) |
| CH₂=CHCH₂CH₂CH=CH₂ + CH₃CH₂CH₂CH=CH₂<br>ClCH₂CH₂CH₂CH=CH₂ + CH₃CH=CHCH₃<br>Cycloheptene + CH₂=CH₂<br>Cyclopentene + CH₃CH=CHCH₂CH₃<br>1,5-cyclooctadiene + 2CH₂=CH₂ | CH₂=CHCH₂CH₂CH=CHCH₂CH₂CH₃ + CH₂=CH₂<br>ClCH₂CH₂CH₂CH=CHCH₃ + CH₂=CHCH₃<br>CH₂=CHCH₂CH₂CH₂CH₂CH₂CH=CH₂<br>CH₃CH=CH—CH₂CH₂CH₂CH=CHCH₂CH₃<br>2CH₂=CHCH₂CH₂CH=CH₂ |
| CH₂=CHCH₂CH₂CH₂CH=CH₂ |  + CH₂=CH₂ |
| CH₂=CHCH₂CH=CHCH₂CH=CH₂ |  + CH₂=CH₂ |
| CH₂=CHCH₂CH(CH₃)—CH₂CH₂—CH=CHCH₃ |  + CH₂=CHCH₃ |
| Cyclopentene | [(CH₂CH=CHCH₂CH₂)ₙ]  n≥2 |
| Cyclododecene | [(CH₂CH₂CH₂CH₂CH₂CH=CHCH₂CH₂CH₂CH₂CH₂)ₙ]  n≥2 |
| CH₂=CHCH₂CH₂CH=CH₂ |  + CH₂=CH₂ |

Reaction conditions in the above reactions are substantially identical to the reaction conditions utilized to form the Group VI–B organometallic catalyst of the instant invention. That is to say, the reactants are contacted at temperatures of −100 to +150° C., preferably 0° to 50° C. at pressures which may range from 0.1 and 1000 atm. and preferably 1 and 100 atm. Condition times will vary between 1 min. and several days, preferably between 0.1 and 24 hours. The reactants should be contacted in the liquid phase within an inert solvent, preferably an organic inert solvent, or the reacting olefin itself may be employed as solvent. Typical solvents which may be utilized are the $C_1$ to $C_{15}$ alkanes, $C_6$ to $C_{10}$ aryls, halogenated $C_1$ to $C_{10}$ alkanes, $C_6$ to $C_{15}$ haloaryls and certain haloalkenes. Specific examples of solvents include pentane, hexane, decane, benzene, xylene, carbon tetrachloride, methylene chloride, tetrachloroethylene, trichloroethylene, chlorbenzene. A wide range of ratios of reactants to catalysts may be employed. Ratios of reactant to catalyst from 10:1 to 20,000:1 on a molar basis may be used with preferred ratios of from 100:1 to 5000:1.

It was also found that the catalysts of the present invention can be used as an isomerization catalyst, e.g. to shift the double bond from one position to another. For instance pentene-1 can be isomerized to pentene-2 cis and pentene-2 trans. Under certain conditions isomerization and disproportionation can be carried out at the same

SPECIFIC EMBODIMENTS

EXAMPLES 1–4

In the following a series of anionic Group VI carbene complexes of the type $A^+[M(CO)_5B]^-$ were investigated in the disproportionation of pentene-1. In each case 0.5 mm. of the transition metal compound was dissolved in 10 ml. chlorobenzene. Then 10 ml. pentene-1 was added, followed by addition of 5 ml. of a 1 molar solution of methylaluminum dichloride in chlorobenzene. The reaction was carried out at ambient temperature. The gas evolution was measured in a buret. Usually the reaction was completed within less than four hours when no more gas was evolved. The reaction products were worked up by vacuo stripping which left only a small residue behind. The distillate was analyzed by G.C. The analysis were made in weight percent on a solvent free basis. The results are summarized in Table I.

TABLE I

| Trans-metal | A | B | Percent C₅-olefins |
|---|---|---|---|
| Molybdenum | N(nC₄H₉)₄ | CH₃—CO | 45.1 |
| Do | N(nC₄H₉)₄ | C₆H₅—CO | 62.1 |
| Tungsten | N(nC₄H₉)₄ | CH₃—CO | 15.9 |
| Do | N(nC₄H₉)₄ | C₆H₅—CO | 45.4 |

Note.—After standing 24 hours before work-up the unreacted pentene-1 had isomerized to a substantial amount.

EXAMPLES 5-6

These examples use a non-ionic tungsten carbene complex of the general type $$M(CO)_5(OR)R'$$

To a solution of 0.5 millimole of above complex ($R=CH_3$; $R'=C_2H_5$) in chlorobenzene were added 10 ml. pentene-1. Subsequently, 5 millimoles methylaluminum dichloride were added and 0.5 millimole of tetra-n-butyl-ammonium chloride. Immediately a fast reaction occurred at ambient temperature which was completed after about 43 minutes. The G.C. analysis showed (weight percent on solvent free basis): 16.5% pentenes, 81.95% octenes, 0.6% hexenes, 1% heptenes.

In another run a different carbene complex was used ($R=C_6H_5$; $R'=C_2H_5$). Using the same molar quantities of catalyst components and monomer a disproportionation was carried out at ambient temperature over a time of 54 minutes rapid gas evolution took place. G.C. analysis of the distillate indicated 70% octenes.

EXAMPLES 7-8

Disproportionation of pentene-1 using ionic carbene complexes with different cations $N(CH_3)_4[Mo(CO)_5COCH_3]$ in the amount of 0.5 millimole was stirred with 10 ml. chlorobenzene. Subsequently 10 ml. pentene-1 and 4 millimoles of $CH_3AlCl_2$ were added. The reaction proceeded immediately at ambient temperature with gas evolution. After 17 hours the volatiles were removd by distillation. Analysis of the distillate by G.C. gave: 41.70% pentene-1, 21.32% T-pentene 2, 33.53% C-pentene-2 and 3.17% $C_8$ olefins (on a solvent free basis).

$Li[Mo(CO)_5COCH_3]$ in the amount of 0.5 millimole in 10 ml. chlorobenzene was reacted with 0.5 millimole of $N(C_4H_9)_4Cl$ and 10 ml. pentene-1. Subsequently 3 ml. of a 1 molar solution of $CH_3AlCl_2$ in chlorobenzene were added. Immediately the gas evolution started. After 17 hrs. all volatiles were removed in vacuo. The distillate was analyzed by G.C. and had following composition (on a solvent free basis): pentene-1 70.40%; T-pentene-2 2.18%; C-pentene-2 1.70%; $C_8$ olefin 25.72%.

EXAMPLES 9-10

Disproportionation of pentene-1 in different solvents than chlorobenzene using methylaluminum sesquichloride as co-catalyst.

| Solvent | Carbene complex | Mm. | Conversion to $C_8$ olefins, Percent W |
|---|---|---|---|
| Benzene | $N(nC_4H_9)_4Mo(CO)_5COC_6H_5$ | .5 | 12.9 |
| Cyclohexane | $N(nC_4H_9)_4Mo(CO)_5COC_6H_5$ | .5 | 23 |

A molar ratio of methyl aluminum sesquichloride to molybdenum complex of 10:1 was used. In each run 10 ml. pentene-1 and 10 ml. solvent were utilized; reaction time ~3 hrs. at ambient conditions.

EXAMPLE 11

Preparation of a high molecular weight polymer from cyclopentene using a neutral carbene complex $W(CO)_5(COCH)_3C_2H_5$ in the amount of 0.5 millimole was dissolved in a mixture of 10 ml. cyclopentene and 20 ml. chlorobenzene. Subsequently 0.5 millimole $$N(nC_4H_9)_4Cl$$

were added followed by the addition of 2 ml. of 1 molar solution of methylaluminum dichloride in chlorobenzene. After 10 minutes stirring at ambient conditions the solution had obtained a high degree of viscosity. After 15 minutes the catalyst was killed by adding 10 ml. of isopropanol containing 2% of a commercial antioxidant. The polymer was precipitated with a 50/50 methanol/isopropanol mixture, redissolved in xylene, precipitated again and then dried in high vacuo. G.C. indicated 1.9 gram of polymer was produced (24.4% conversion). The polymer was of high molecular weight.

EXAMPLE 12

Disproportionation of a branched olefin $W(CO)_5(COCH_3) C_2H_5$ in the amount of 0.5 millimole was dissolved in 10 ml. chlorobenzene and 10 ml. 4-methylpentene-1 at ambient conditions. Subsequently added were 0.5 millimole $N(nC_4H_9)_4Cl$, followed 2 ml. of a 1 molar solution of methylaluminum dichloride in chlorobenzene. Immediately the evolution of $C_2H_4$ commenced. After one hour the volatile products were stripped in vacuo. G. C. Analysis on a solvent free basis gave 27.4% 2,7-dimethyl-octene-4.

EXAMPLE 13

Disproportionation of a non-cyclic diolefin: 1,7-octadiene $W(CO)_5(COCH_3) C_2H_5$ in the amount of 0.5 millimole was dissolved in 10 ml. chlorobenzene and 10 ml. 1,7-octadiene at ambient conditions. Following this 0.5 millimole of $N(nC_4H_9)_4Cl$ and 2 ml. of a 1 molar solution of mehtylaluminum dichloride were added. Immediately ethylene was evolved. After less than 2 hours the volatiles were distilled in vacuo. G. C. analysis indicated 29.2% cyclohexene on a solvent free basis.

EXAMPLE 14

Disproportionation of octene-1 at elevated temperature $N(nC_4H_9)_4Mo(CO)_5COC_6H_5$ in the amount of 0.5 millimole was contacted with 10 ml. chlorobenzene and 10 ml. octene-1 at ambient conditions. Subsequently, 5 millimoles of methylaluminum dichloride in chlorobenzene (5 ml.) were added and the reactants heated to 72° C. for slightly more than 1 hour; ethylene was evolved. After termination of the reaction the solvent and the unreacted $C_8$-olefin were distilled off in vacuo. The analysis of the product by G. C. in the residue after catalyst removal indicated that it consisted of about 94 wt. percent tetradecenes. (2.8 g.)

EXAMPLE 15

Disproportionation of an internal olefin; pentene-2

$N(nC_4H_9)_4Mo(CO)_5COC_6H_5$ in the amount of 0.5 millimole was stirred with 10 ml. chlorobenzene and 10 ml. pentene-2. Subsequently 5 ml. of a 1 molar solution of methylaluminum dichloride in chlorobenzene were added. After 24 hrs. the volatiles were stripped off in vacuo (20 g.). G.C. analysis on a solvent-free basis (W percent) gave 17.1% butenes and 30.6% $C_6$-olefins. Some of the butenes were lost in the stripping. The data indicate a substantial amount of disproportionation.

EXAMPLE 16-18

Effect of the halide activator on disproportionation activity of pentene-1 using a neutral carbene complex The results of the test are summarized in Table II. In each case 0.5 millimole of $W(CO)_5(COCH_3) C_2H_5$ were dissolved in a mixture of 10 ml. chlorobenzene and 10 ml. pentene-1; halide activator which was tetra-n-butylammonium chloride was added. Finally the disproportionation was started by adding 2 ml. of a 1 molar solution of methylaluminum dichloride in chlorobenzene. In each case the reaction started almost immediately as evidenced by gas evolution. All reactions were carried out at ambient temperature.

TABLE II

| Amount of halide activator (millimoles): | Conversion to $C_8$ olefin (%W) as determined by G.C. |
|---|---|
| 0.25 | 58.8 |
| 0.50 | 54.3 |
| 1.00 | 2.2 |

No more gas evolution was observed after about 90 minutes. The work up and catalyst removal was essentially the same as in Examples 1–4.

EXAMPLE 19

Preparation of a high molecular weight polymer from cyclopentene using an ionic carbene complex $N(nC_4H_9)_4Mo(CO)_5COC_6H_5$ in the amount of 0.5 millimole was dissolved in a mixture of 10 ml. chlorobenzene and 10 ml. cyclopentene. Subsequently 2 ml. of a 1 molar solution of methylaluminum dichloride in chlorobenzene were added. After 1 hour the catalyst was killed by adding 10 ml. isopropanol which contained a commercial antioxidant. The polymer was then precipitated, dissolved, reprecipitated and finally dried. 0.3 g. white, rubbery polymer were obtained which had an average molecular weight of 585,000 as determined by gel permeation chromatography.

EXAMPLE 20

Disproportionation of pentene-1 at low temperature

Using the same catalyst condition except as otherwise indicated and the same amounts of catalysts and reactants as in Run #2, a disproportionation was carried out at 0° C. over a period of 44 minutes. 22% conversion to octenes was obtained by gas chromatographic analysis (percent W on solvent free basis).

We claim:

1. A process for preparing a catalyst which consists essentially of contacting a carbene complex selected from the group consisting of complexes having the formulas $$A[M(CO)_5COR] \text{ and } M(CO)_5(COR)R'$$

wherein A is a unipositive cation selected from the group consisting of Li, Na, K and cations having the general formula $J_4Q$ wherein Q is a Group V element and J is selected from the group consisting of hydrogen and $C_1$ to $C_{30}$ hydrocarbyl radicals, M is a Group VI–B metal, R and R' are $C_1$ to $C_{30}$ hydrocarbyl radicals, with an organometallic halide selected from the group consisting of compounds having the general formula $R''_nDY_m$ wherein R'' is chosen from the group consisting of $C_1$ to $C_{30}$ hydrocarbyl radicals, D is a metal selected from the group consisting of Group II and Group III of the Periodic Table of the Elements, Y is a halide, and $n$ is an integer of from 1 to 3 and $m$ is an integer of from 0 to 3, their total equal to the valence of D, the molar ratio of organometallic halide to Group VI–B metal being from about 0.5:1 and 50:1, at a temperature of from about −100 to +150° C. and a pressure of from about 0.1 to 1000 atmospheres, whereby a catalyst is formed.

2. The process of claim 1 wherein said carbene complex is selected from the group consisting of complexes having the formula $M(CO)_5(COR)R'$ wherein M is a Group VI–B metal, R and R' are $C_1$ to $C_{30}$ hydrocarbyl radicals, and wherein said carbene complex is contacted with said organometallic halide in the presence of a quaternary ammonium halide, said molar ratio of quaternary ammonium halide to carbene complex being from 0.1 to 1 to 2 to 1.

3. The process of claim 1 wherein said organometallic halide is methyl aluminum dichloride.

4. The process of claim 1, wherein said organometallic halide is methyl aluminum sesquichloride.

5. The process of claim 2 wherein said quaternary ammonium halide is tetra-n-butyl ammonium chloride.

6. A process for preparing a catalyst which consists essentially of contacting a carbene complex selected from the group consisting of complexes having the formulas $$A[M(CO)_5COR] \text{ and } M(CO)_5(COR)R'$$

wherein A is a unipositive cation selected from the group consisting of Li, Na, K and cations having the general formula $J_4Q$ wherein Q is a Group V element and J is selected from the group consisting of hydrogen and $C_1$ to $C_{30}$ hydrocarbyl radicals, M is a Group VI–B metal, R and R' are $C_1$ to $C_{30}$ hydrocarbyl radicals, with $AlX_3$, wherein X is a halide, the molar ratio of $AlX_3$ to Group VI–B metal being from about 0.5:1 to 50:1, at a temperature of from about −100 to +150° C. and a pressure of from about 0.1 to 1000 atmospheres, whereby a catalyst is formed.

7. The process of claim 1, wherein J is selected from the group consisting of phenyl and $C_1$ to $C_6$ alkyl radicals.

8. The product of claim 1.

References Cited

UNITED STATES PATENTS

| | | | |
|---|---|---|---|
| 3,363,014 | 1/1968 | Kittleman et al. | 252—431 N X |
| 3,474,117 | 10/1969 | Tedeschi et al. | 252—431 R X |
| 3,530,196 | 9/1970 | Singleton | 260—683 D X |

PATRICK P. GARVIN, Primary Examiner

U.S. Cl. X.R.

252—431 R, 431 N, 431 P; 260—683 D